US011249018B2

(12) United States Patent
Lee et al.

(10) Patent No.: US 11,249,018 B2
(45) Date of Patent: Feb. 15, 2022

(54) OPTICAL REFRACTOMETER AND REAL TIME MONITORING ANALYSIS DEVICE HAVING THE SAME

(71) Applicant: X-Beam Tech Co., Ltd., Seoul (KR)

(72) Inventors: Sang-Shin Lee, Seoul (KR); Changyi Zhou, Seoul (KR); Yong-Geon Lee, Seoul (KR); Woo-Bin Lee, Seoul (KR)

(73) Assignee: X-Beam Tech Co., Ltd., Seoul (KR)

( * ) Notice: Subject to any disclaimer, the term of this patent is extended or adjusted under 35 U.S.C. 154(b) by 0 days.

(21) Appl. No.: 16/971,957

(22) PCT Filed: Feb. 20, 2019

(86) PCT No.: PCT/KR2019/002074
§ 371 (c)(1),
(2) Date: Aug. 21, 2020

(87) PCT Pub. No.: WO2019/164265
PCT Pub. Date: Aug. 29, 2019

(65) Prior Publication Data
US 2020/0393372 A1    Dec. 17, 2020

(30) Foreign Application Priority Data
Feb. 22, 2018   (KR) ........................ 10-2018-0021256

(51) Int. Cl.
*G01N 21/41*     (2006.01)
*G01B 9/02*      (2006.01)
(Continued)

(52) U.S. Cl.
CPC ....... *G01N 21/4133* (2013.01); *G01B 9/0209* (2013.01); *G01N 21/41* (2013.01);
(Continued)

(58) Field of Classification Search
CPC ......... G01N 21/4133; G01N 2021/416; G01N 2021/4153; G02B 5/04
See application file for complete search history.

(56) References Cited

U.S. PATENT DOCUMENTS 4,682,889 A  *  7/1987  Harmer .............. G01N 21/4133
356/135
2003/0169417 A1   9/2003  Atkinson et al.
(Continued)

FOREIGN PATENT DOCUMENTS

JP    2001-242079 A    9/2001
JP    2004-150923 A    5/2004
(Continued)

OTHER PUBLICATIONS

English translation of JP 2001242079. Acquired from Google patents on Jul. 16, 2021. (Year: 2021).*
(Continued)

*Primary Examiner* — Michael A Lyons
(74) *Attorney, Agent, or Firm* — Knobbe Martens Olson & Bear LLP (57) ABSTRACT

This application relates to an optical refractometer. In one aspect, the optical refractometer includes a prism, a light source and a sensor. The prism includes a first surface to which light is incident, a second surface to which the incident light is refracted when it contacts a substance, and a third surface reflecting the light refracted at the second surface toward the first surface. The light source emits light onto the first surface of the prism to be refracted toward the second surface. The sensor receives the light reflected from the third surface and output from the first surface. The light projected from the light source travels an optical path that directs the light to pass through the first surface of the prism,
(Continued)

refract on the second surface, reflect on the third surface, and emit and condense to the first surface.

12 Claims, 9 Drawing Sheets

(51) Int. Cl.
    *G02B 5/04*           (2006.01)
    *G02B 6/02*           (2006.01)
    *G01N 21/49*         (2006.01)

(52) U.S. Cl.
    CPC ............... *G01N 21/49* (2013.01); *G02B 5/04* (2013.01); *G02B 6/02* (2013.01)

(56) References Cited

U.S. PATENT DOCUMENTS

| | | |
|---|---|---|
| 2004/0145731 A1 | 7/2004 | Nakajima et al. |
| 2014/0104601 A1* | 4/2014 | Baba .................. G01N 21/4133 356/135 |
| 2015/0293274 A1* | 10/2015 | Cagran ................ G01N 21/552 356/445 |
| 2017/0074791 A1 | 3/2017 | Amamiya et al. |

FOREIGN PATENT DOCUMENTS

| | | |
|---|---|---|
| JP | 3919749 B2 | 5/2007 |
| KR | 10-2002-0094110 A | 12/2002 |
| KR | 10-2008-0101603 A | 11/2008 |
| KR | 10-2016-0006158 A | 1/2016 |

OTHER PUBLICATIONS

English translation of KR 20020094110. Acquired from Google patents on Jul. 16, 2021. (Year: 2021).*
International Search Report and Written Opinion dated May 27, 2019 in International Application No. PCT/KR2019/002074, in 12 pages. (English translation of ISR.).

* cited by examiner

OPTICAL REFRACTOMETER AND REAL TIME MONITORING ANALYSIS DEVICE HAVING THE SAME

The present application is a U.S. national phase application under 35 U.S.C. § 371 of International Application No. PCT/KR2019/002074, filed on Feb. 20, 2019, which claims the benefit of Korean Patent Applications No. 10-2018-0021256 filed on Feb. 22, 2018, in the Korean Intellectual Property Office, the entire disclosure of each of which is incorporated herein by reference.

BACKGROUND

1. Field

The present invention relates to an optical refractometer and a real time monitoring analysis device having the same. More particularly, the present invention relates to an optical refractometer including a prism and a real time monitoring analysis device having the same.

2. Description of Related Art

Refractometry is the method of measuring substances' composition, purity or the like by using an optical refractometer. Refractometry is used to analyze composition of a certain drug, to measure salinity and specific gravity of seawater, or to measure protein in a protein solution, etc.

Refractometry is the analytical method of measuring substances' refractive index (i.e., liquid sample) by using an optical refractometer. The refractive index is a phenomenon caused by changing a direction of a light ray when it travels from one medium to another medium, and is represented by the following equation:

$$n = \sin i / \sin r$$

wherein n is a refractive index, i is an angle of incidence, and r is an angle of refraction.

The refractive index varies with temperature and wavelength but is used to identify a particular substance, confirm its purity or measure its concentration under constant conditions since the refractive index is a fundamental physical property of a medium.

However, since the conventional optical refractometer is used by placing a small amount of a substance therein, there are many restrictions on its use. It has been also limited to use in various applications due to high costs.

In JP Patent Publication No. 2004-150923, a refractometer is disclosed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An object of the present invention is to provide an optical refractometer capable of analyzing a substance by directly contacting the substance, which does thus not require for sampling the substance therein.

Another object of the present invention is to provide a real time monitoring analysis device having the same.

According to an aspect of the present invention, there is provided an optical refractometer including: a prism including a first surface to which light is incident, a second surface to which the incident light is refracted when it contacts with a substance, and a third surface reflecting the light refracted at the second surface to be emitted to the first surface; a light source that inputs light on the first surface of the prism toward the second surface; and a sensor part that receives the light reflected from the third surface and emitted from the first surface, wherein the light projected from the light source travels an optical path that directs the light to pass through the first surface of the prism, refract on the second surface, reflect on the third surface, and emit and condense to the first surface.

The prism may be formed in a wedge shape having an acute angle between the first surface and the second surface at one side and the third surface in a curved or aspherical shape connecting the first surface and the second surface on the other side.

A light reflection layer may be formed on the third surface of the prism and may block the contact between the substance and the third surface.

The optical refractometer may further include a first optical cable connecting the light source and the first surface of the prism and a second optical cable connecting the sensor part and the first surface of the prism.

The substance may be liquid. The prism, the first optical cable, and the second optical cable may be composed as one unit to be immersed in the substance in a liquid state.

According to another aspect of the present invention, there is provided a real time monitoring analysis device with an optical refractometer including: a prism including a first surface to which light is incident, a second surface to which the incident light is refracted when it contacts with a substance, and a third surface reflecting the light refracted at the second surface to be emitted to the first surface; a light source that inputs light on the first surface of the prism toward the second surface; a sensor part that receives the light reflected from the third surface and emitted from the first surface; a signal analysis part connected to the sensor part; and a display part connected to the signal analysis part to display the analyzed result, wherein the light projected from the light source travels an optical path that directs the light to pass through the first surface of the prism, refract on the second surface, reflect on the third surface, and emit and condense to the first surface.

The sensor part may include a photodetector or a charge coupled device (CCD).

The real time monitoring analysis device with an optical refractometer may further include a control part connected to the light source and the sensor part to control them, wherein the light source, the sensor part and the control part may be formed as one transmission/reception unit.

According to an embodiment of the present invention, the prism of the optical refractometer may be directly inserted into or contacted with a substance such as a solution to facilitate analysis of the substance without sampling.

In addition, it may allow mass production which lowers the production cost due to simple structure.

DETAILED DESCRIPTION

The terms used in the description are intended to describe certain embodiments only, and shall by no means restrict the present disclosure. Unless clearly used otherwise, expressions in the singular number include a plural meaning.

In the present description, an expression such as "comprising" or "composed of" is intended to designate a characteristic, a number, a step, an operation, an element, a part or combinations thereof, and shall not be construed to preclude any presence or possibility of one or more other characteristics, numbers, steps, operations, elements, parts or combinations thereof. In addition, in the present description, an expression such as "upper" or "on" means that it is located above or below a target part, and does not necessarily mean that it is located above the gravity direction.

When one element is described as being "connected" or "coupled" to another element, it shall be construed as being connected or accessed to the other element directly but also as possibly having another element in between.

While such terms as "first" and "second," etc., may be used to describe various components, such components must not be limited to the above terms. The above terms are used only to distinguish one component from another.

The drawings may not be to scale, and the relative size, proportions, and depiction of elements in the drawings may be exaggerated for clarity, illustration, and convenience.

The present invention will be described below in more detail with reference to the accompanying drawings, in which those components are rendered the same reference number that are the same or are in correspondence, regardless of the figure number, and redundant explanations are omitted.

Optical Refractometer

Figure 1:
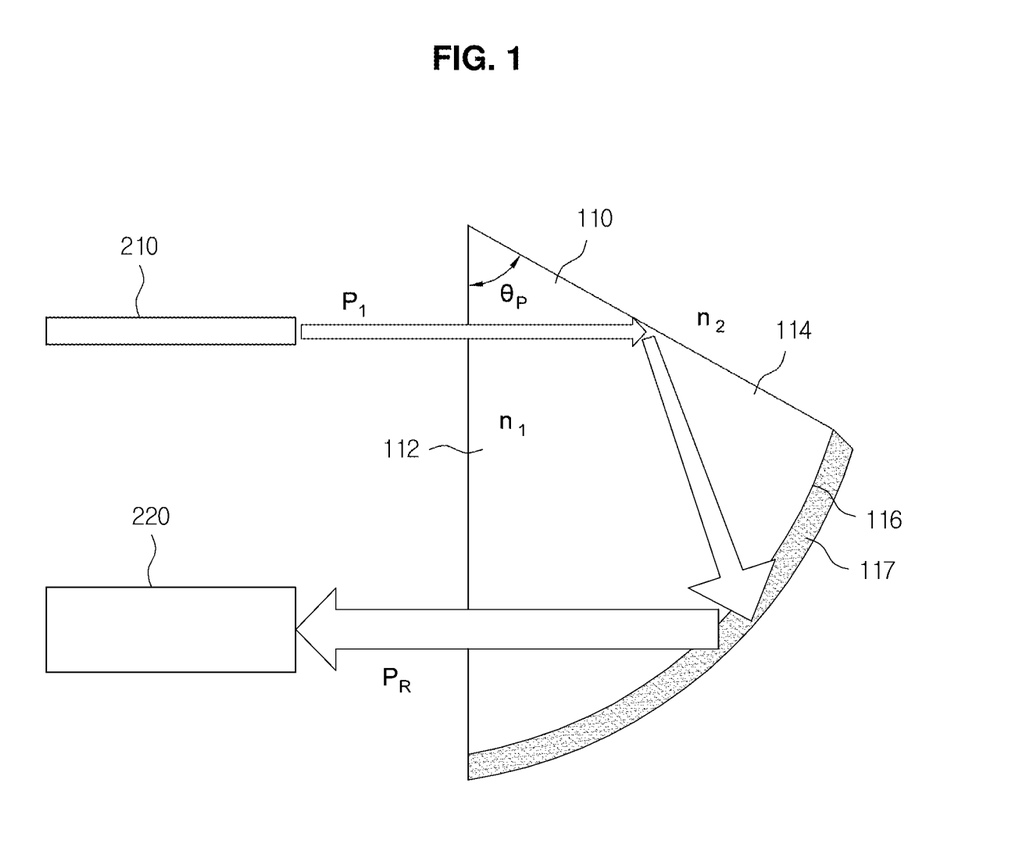
FIG. 1 is a diagram illustrating an optical refractometer according to an embodiment of the present invention.
Figure 2:
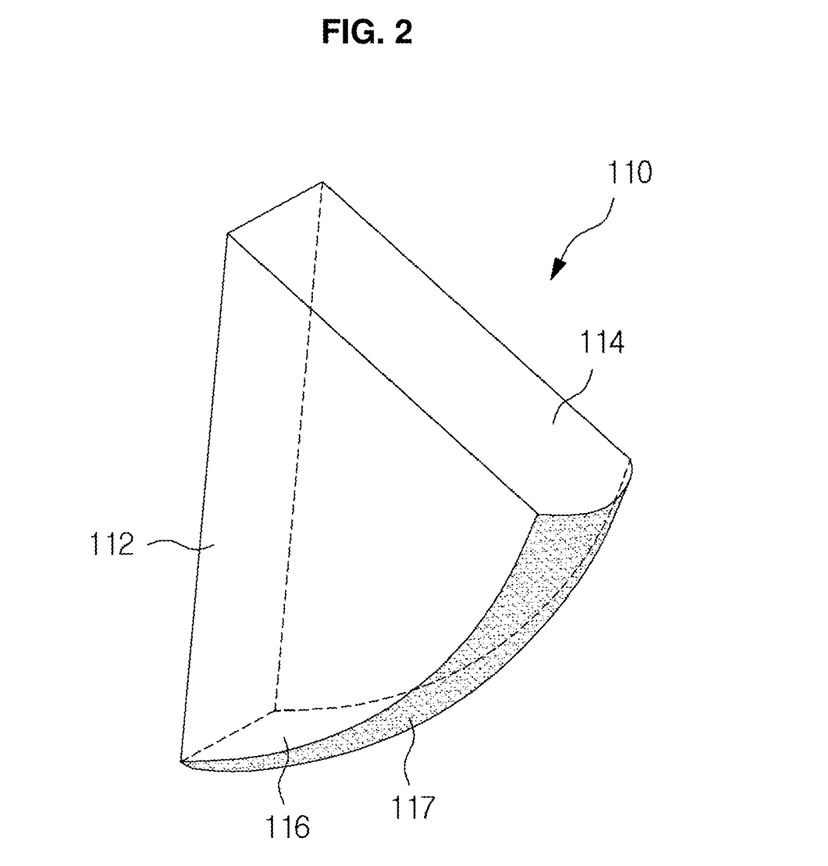
FIG. 2 is a diagram illustrating a prism shape of an optical refractometer according to an embodiment of the present invention.

FIG. 1 is a diagram illustrating an optical refractometer according to an embodiment of the present invention and FIG. 2 is a diagram illustrating a prism shape of an optical refractometer according to an embodiment of the present invention.

An optical refractometer according to an embodiment of the present invention may include a prism 110, a light source 210, and a sensor part 220, wherein the optical refractometer may have an optical path that directs light Pi projected from the light source 210 to pass through a first surface 112 of the prism 110, refract on a second surface 114, reflect on a third surface 116, and condense the light PR to the sensor part 220.

The light source 210 in the optical refractometer may generate light required for analyzing a substance.

Referring to FIG. 1, the light generated from the light source 210 may be directed toward the prism 110 to be projected onto the first surface 112 of the prism 110.

The sensor part 220 may receive the light from the prism 110. An amount of light refracted at the interface between the prism 110 and the substance may vary depending on the refractive index of the substance, and the sensor part 220 may measure this change to analyze/measure composition or concentration of the substance.

Referring to FIG. 1, the light refracted and reflected along the internal optical path of the prism 110 may travel back to the first surface 112 of the prism 110 and, thus, the sensor part 220 may be arranged to face the first surface 112 of the prism 110 to receive the light.

The prism 110 may serve to pass the light projected from the light source 210 and refract the light at an interface contacting the substance. To this end, the prism 110 may be made of a material through which light is transmitted and which has a higher refractive index than the substance does. The light passing through the prism 110 having a higher refractive index than the substance may be refracted at the interface (i.e., the second surface 114) between the prism 110 and the substance. It may be thus possible to analyze/measure composition or concentration of the substance by comparing the change in the amount of light refraction.

The prism 110 of the present embodiment may have a structure in which light passes through the first surface 112, refracts on the second surface 114, and reflects on the third surface 116. Particularly, the second surface 114 of the prism 110 may directly contact with the substance. The prism 110 may include the first surface 112 to which light is incident, the second surface 114 to which the incident light is refracted when it contacts with the substance, and the third surface 116 reflecting the light refracted at the second surface 114 to be emitted to the first surface 112.

Referring to FIG. 2, the prism 110 may be formed in a wedge shape having an acute angle where the first surface 112 and the second surface 114, which are flat surfaces, meet at one side, and the third surface 116, which is a curved or aspherical shape, connecting the first surface 112 and the second surface 114 at the other side. The angle $\theta_P$ between the first surface 112 and the second surface 114 and a material of the prism 110 may be controlled (optimized) depending on the substance to be measured.

A light reflection layer 117 may be formed on the third surface 116 of the prism 110. The light reflection layer 117 may reflect the light refracted from the second surface 114 of the prism 110 with a small loss and simultaneously send and condense the light to the first surface 112. The condensed light may be collected by a second optical cable 140 to be described later. The light reflection layer 117 may block the contact between substance and the third surface 116 through which the light passes, so that the interface, where the prism 110 and substance are in contact with each other, may not be formed on the third surface 116.

The above-described wedge-shaped prism may control an angle between the first surface 112 and the second surface 114 to set a sensitivity of optic power for a predetermined refractive index.

Figure 6:
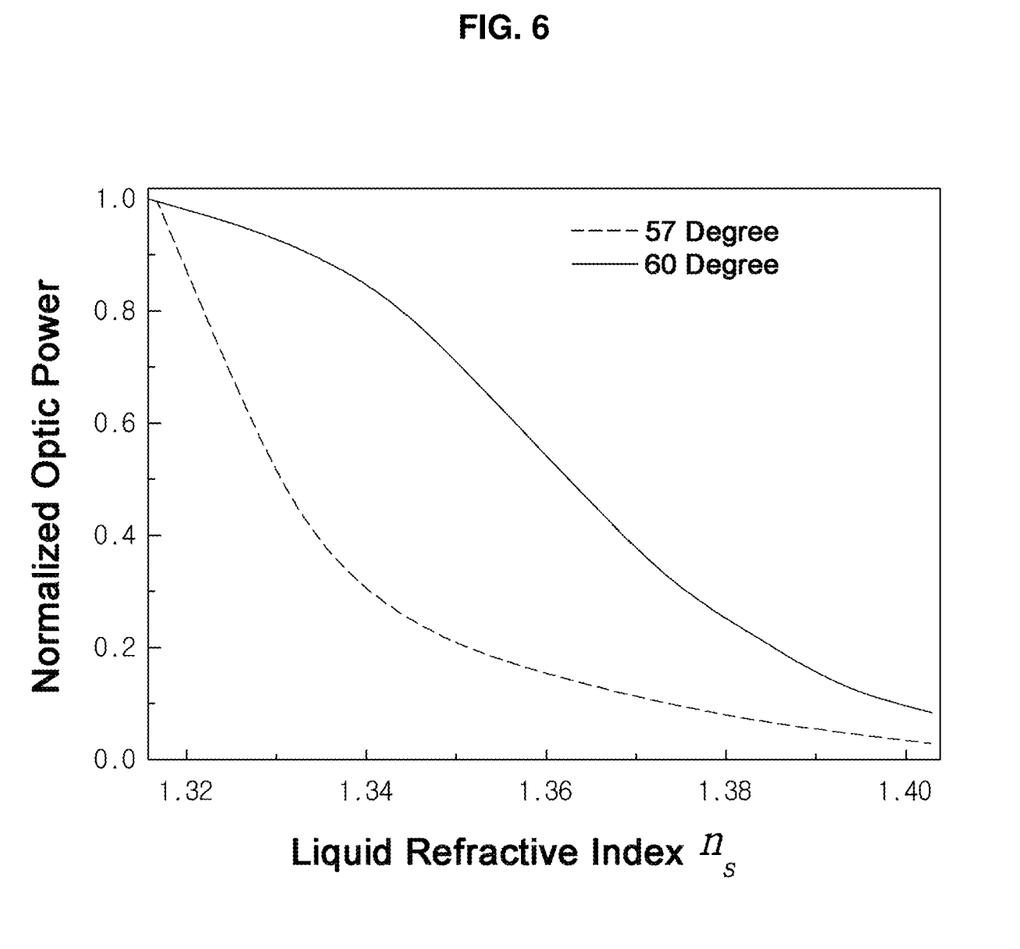
FIG. 6 is a graph illustrating an optic power for a liquid refractive index depending on an angle between a first surface and a second surface in a wedge-shaped prism.

FIG. 6 is a graph illustrating an optic power for a liquid refractive index depending on an angle between a first surface and a second surface in a wedge-shaped prism.

Figure 8:
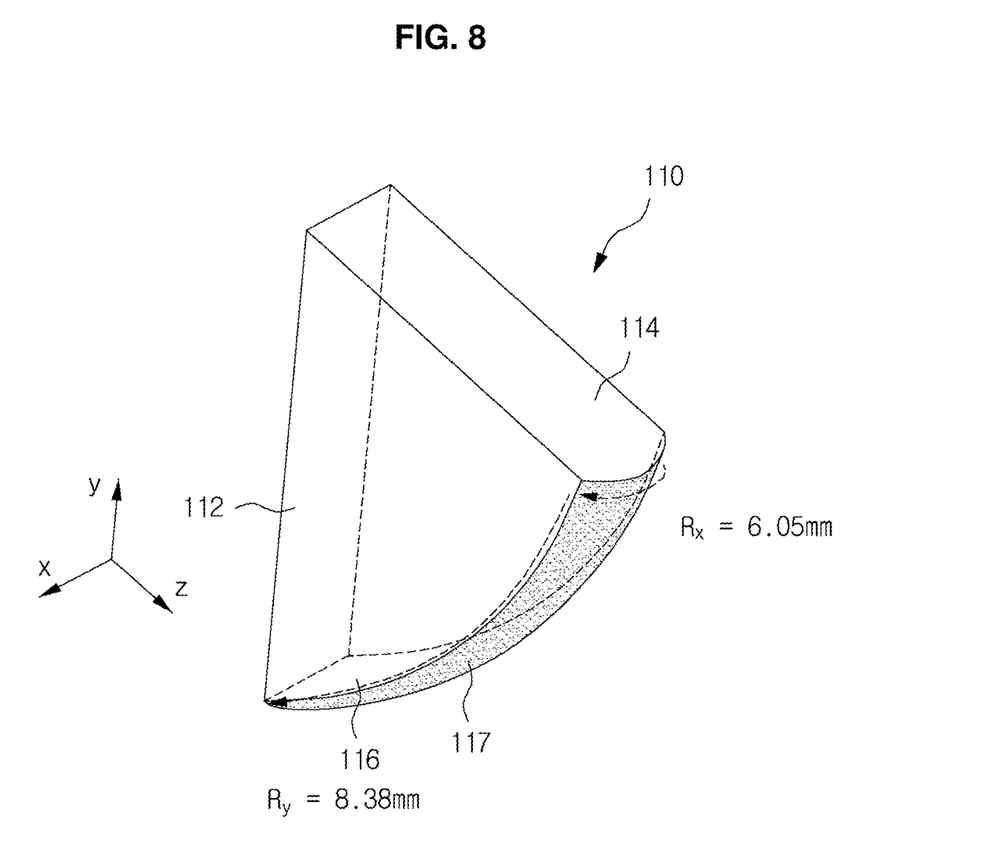
FIG. 8 and FIG. 9 are diagrams illustrating a prism shape of an optical refractometer according to an embodiment of the present invention.
Figure 9:
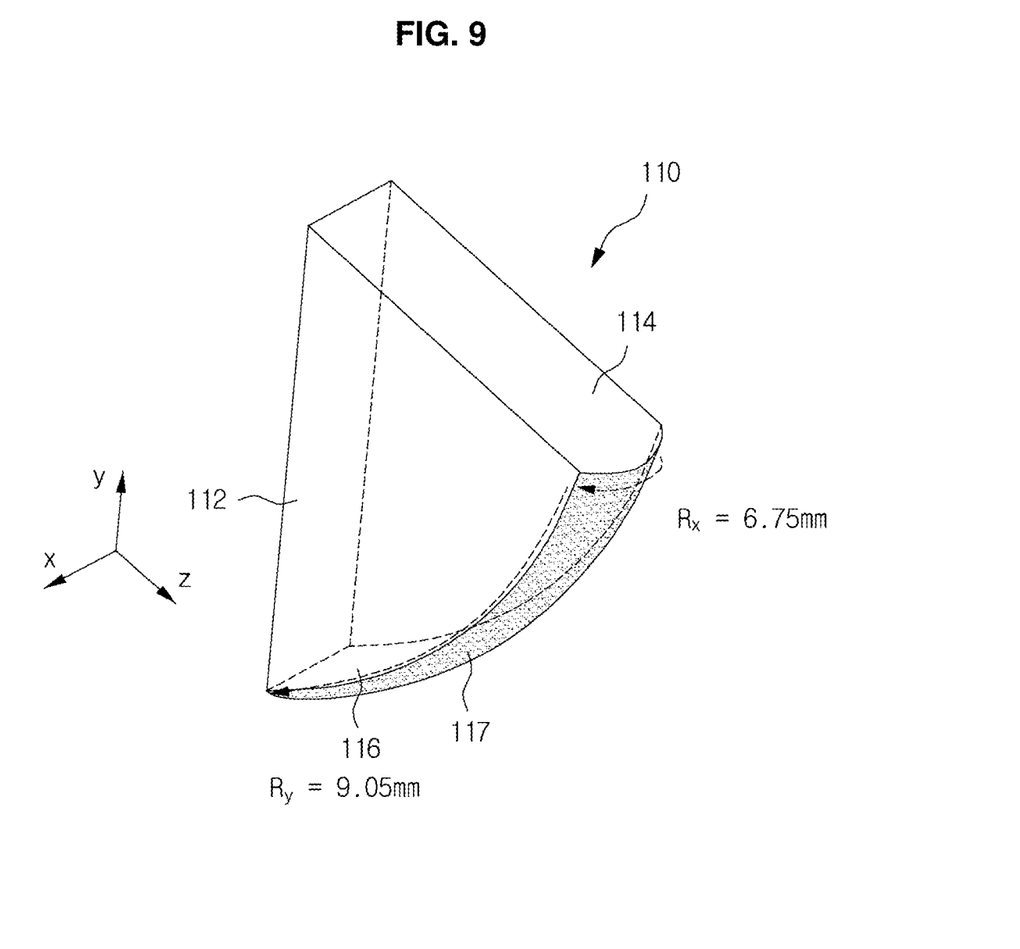

FIG. 8 and FIG. 9 are diagrams illustrating a prism shape of an optical refractometer according to an embodiment of the present invention. FIG. 8 is a diagram illustrating a prism in a 57 degree wedge shape and FIG. 9 is a diagram illustrating a prism in a 60 degree wedge shape.

Referring to FIG. 8, the 57 degree wedge-shaped prism 110 may be made of a polycarbonate material, and the angle between the first surface 112 and the second surface 114 may be selected to be 57 degree, a radius of curvature (Rx) in an x-axial direction may be 6.05 mm, and a radius of curvature (Ry) in a y-axis direction may be 8.38 mm.

Referring to FIG. 9, the 60 degree wedge-shaped prism 110 may be made of a polycarbonate material, the angle between the first surface 112 and the second surface 114 may be selected to be 60 degree, a radius of curvature (Rx) in an x-axial direction may be 6.75 mm, and a radius of curvature (Ry) in a y-axis direction may be 9.05 mm.

FIG. 6 is a graph illustrating an optic power depending on an angle of the wedge-shaped prism for the light which is incident to the first surface 112 from an optical cable having a numerical aperture of 0.14, is reflected on the second surface 114 and the third surface 116 based on a refractive index of a substance, and is emitted back to the first surface 112.

Referring to FIG. 6, it is noted that the 57-degree wedge-shaped prism 110 has a high sensitivity in a section of 1.316 to 1.33 of the refractive index of a solution, which is the substance, and the 60-degree wedge-shaped prism 110 has a high sensitivity in a section of 1.347 to 1.37 of the refractive index of a solution, which is the substance. That is, it is confirmed that the angle between the first surface 112 and the second surface 114 in the wedge-shaped prism 110 is adjusted to set the sensitivity of optic power for the refractive index in a certain section.

For example, the refractive index of deionized water (DI water), which is the purest water, is about 1.316 at the 1550 nm wavelength band. Therefore, the sensitivity for the refractive index of deionized water and a solution made with deionized water may be optimally determined when the optic power is measured by using the 57-degree wedge-shaped prism 110.

A first optical cable 130 connected to the light source 210 and a second optical cable 140 connected to the sensor part 220 may be coupled to the first surface 112 of the prism 110. The first optical cable 130 and the second optical cable 140 may be directly coupled to the prism 110 to prevent light from being lost or changed. Particularly, when the substance is a liquid such as a solution, the prism 110, the first optical cable 130, and the second optical cable 140 may be composed as one unit to be immersed therein. Therefore, the prism 110 of the optical refractometer may be directly immersed into or contacted with a substance such as a solution to facilitate analysis of the substance without sampling.

A single-mode optical cable may be used as the first optical cable 130 connected to the light source 210 to incident light into the prism 110, while a multi-mode optical cable may be used as the second optical cable 140 connected to the sensor part 220 to receive light from the prism 110. The optical cable connected to the light source 210 may be better to have a smaller core and the optical cable connected with the sensor part 220 may be better to have a larger core in order to prevent light from leaking as much as possible. For example, a core of a single-mode optical cable may be 9 um in size and a core of a multi-mode optical cable may be 50, 57, 62.5, or 105 um in size.

A block member 120 may be further included in order to precisely and firmly align the first optical cable 130 and the second optical cable 140 with the prism 110. The block member 120 may be disposed on the first surface 112 of the prism 110 to be coupled with the prism 110 and may have a V-shaped groove facing the first surface 112. The first optical cable 130 and the second optical cable 140 may be inserted and aligned in the V-shaped groove.

The numerical aperture of the first optical cable 130 may be adjusted to set a sensitivity and a linearity of the optical power for a predetermined refractive index.

Figure 7:
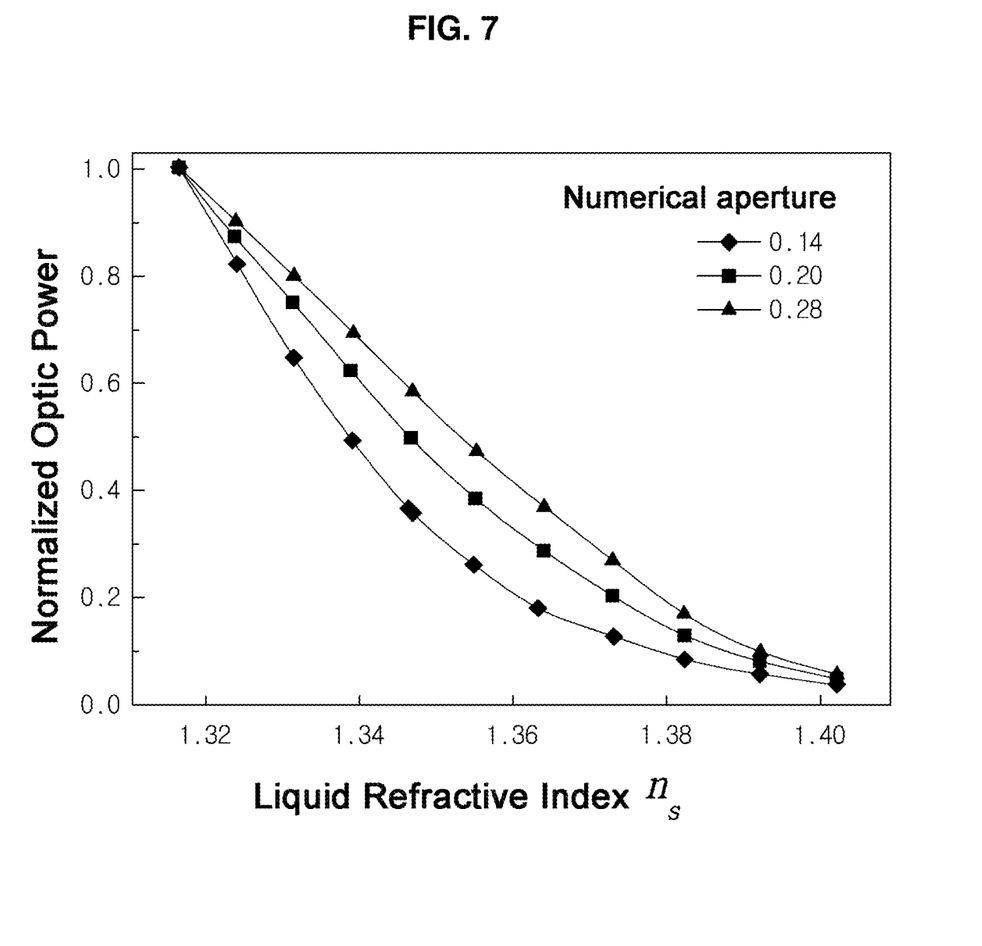
FIG. 7 is a graph illustrating an optic power for a liquid refractive index depending on a numerical aperture of a first optical cable connected to a wedge-shaped prism.

FIG. 7 is a graph illustrating an optic power for a liquid refractive index depending on a numerical aperture of a first optical cable connected to a wedge-shaped prism.

Particularly, FIG. 7 is a graph illustrating an optic power depending on numerical aperture of the first optical cable 130 in a 57-degree wedge-shaped prism 110 for the light which is incident to the first surface 112, is reflected on the second surface 114 and the third surface 116 based on a refractive index of a substance, and is emitted back to the first surface 112.

Referring to FIG. 7, it can be seen that when the numerical aperture of the first optical cable 130 is changed, the sensitivity increases or decreases in a specific section of the optic power in the wedge-shaped prism 110. In addition, it can be seen that when the numerical aperture of the first optical cable 130 is changed, the linearity between the refractive index of the solution to be measured and the optical power is increased or decreased. Since the linearity between the refractive index of the solution and the optic power and the high sensitivity in a specific section exhibit a trade-off relationship with each other, it is preferable to set them according to a substance to be measure and purpose.

As described above, since the optical refractometer of this embodiment has a structure including the prism 110 that makes easy for the mass-production, it is easy to manufacture according to a substance and lowers the production cost.

Analytical Device

Figure 3:
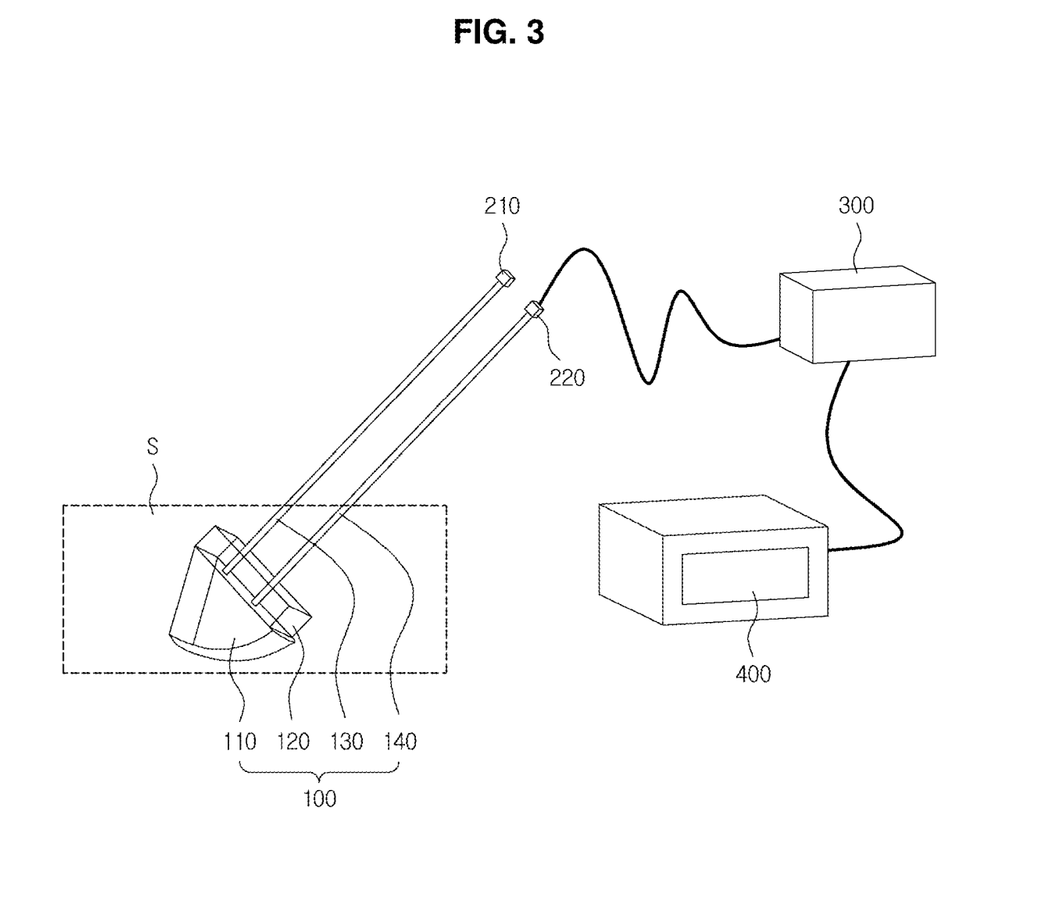
FIG. 3 is a diagram illustrating a real time monitoring analysis device with an optical refractometer according to an embodiment of the present invention.

FIG. 3 is a diagram illustrating a real time monitoring analysis device with an optical refractometer according to an embodiment of the present invention.

Referring to FIG. 3, a real time monitoring analysis device having an optical refractometer according to an embodiment of the present invention may include a prism 110, a light source 210, a sensor part 220, a signal analysis part 300, and a display part 400, wherein the light projected from the light source travels an optical path that directs the light to pass through a first surface of the prism, refract on a second surface, reflect on a third surface, and emit and condense to the first surface.

The light source 210 in the optical refractometer may generate light required for analyzing a substance.

The light generated from the light source 210 may be directed toward the prism 110 to be projected onto the first surface 112 of the prism 110.

The sensor part 220 may receive the light from the prism 110. An amount of light refracted at the interface between the prism 110 and the substance may vary depending on the refractive index of the substance, and the sensor part 220 may measure this change to analyze/measure composition or concentration of the substance. The light refracted and reflected along the internal optical path of the prism 110 may travel back to the first surface 112 of the prism 110 and the sensor part 220 may be arranged to face the first surface 112 of the prism 110 to receive the light.

Examples of the sensor part may include a photodetector and a charge coupled device (CCD).

The photodetector is a device that detects an optical signal and converts it into an electrical signal. Examples of the photodetector may include a diode-type photodetector and a photoconductor-type photodetector depending on the type of optical signal to be detected.

The charge coupled device (CCD) may be a sensor that converts light into electric charges to produce images. A CCD chip may be a chip composed of many photodiodes. When light is absorbed in each photodiode, electrons are generated in response to an amount of the light and the amount of electrons in the photodiode represents the brightness of each light which is reconstructed to produce image information on a screen.

The prism 110 may serve to pass light projected from the light source 210 and to refract the light at an interface contacting a substance. To this end, the prism 110 may be made of a material through which light is transmitted and which has a higher refractive index than the substance has. The light passing through the prism 110 having a higher refractive index than the substance may be refracted at the interface (i.e., the second surface 114) between the prism 110 and the substance. It may be thus possible to analyze/measure composition or concentration of the substance by comparing the change in the amount of light refraction.

The prism 110 of the present embodiment may have a structure in which light passes through the first surface 112, refracts on the second surface 114, and reflects on the third surface 116. Particularly, the second surface 114 of the prism 110 may directly contact with the substance. The prism 110 may include the first surface 112 to which light is incident, the second surface 114 to which the incident light is refracted when it contacts with the substance, and the third surface 116 reflecting the light refracted at the second surface 114 to be emitted to the first surface 112.

Referring to FIG. 2, the prism 110 may be formed in a wedge shape having an acute angle where the first surface 112 and the second surface 114, which are flat surfaces, meet at one side, and the third surface 116, which is a curved or aspherical shape, connecting the first surface 112 and the second surface 114 at the other side. An angle $\theta_P$ between the first surface 112 and the second surface 114 and a material of the prism 110 may be controlled (optimized) depending on a substance to be measured.

A light reflection layer 117 may be formed on the third surface 116 of the prism 110. The light reflection layer 117 may reflect the light refracted from the second surface 114 of the prism 110 with a small loss and simultaneously send and condense the light to the first surface 112. The condensed light may be collected by a second optical cable 140 to be described later. The light reflection layer 117 may block the contact between substance and the third surface 116 through which the light passes, so that the interface, where the prism 110 and substance are in contact with each other, may not be formed on the third surface 116.

The above-described wedge-shaped prism may control an angle between the first surface 112 and the second surface 114 to set a sensitivity of optic power for a predetermined refractive index.

FIG. 6 is a graph illustrating an optic power for a liquid refractive index depending on an angle between a first surface and a second surface in a wedge-shaped prism.

FIG. 8 and FIG. 9 are diagrams illustrating a prism shape of an optical refractometer according to an embodiment of the present invention. FIG. 8 is a diagram illustrating a prism in a 57 degree wedge shape and FIG. 9 is a diagram illustrating a prism in a 60 degree wedge shape.

Referring to FIG. 8, the 57 degree wedge-shaped prism 110 may be made of a polycarbonate material, the angle between the first surface 112 and the second surface 114 may be selected to be 57 degree, a radius of curvature (Rx) in an x-axial direction may be 6.05 mm, and a radius of curvature (Ry) in a y-axis direction may be 8.38 mm.

Referring to FIG. 9, the 60 degree wedge-shaped prism 110 may be made of a polycarbonate material, the angle between the first surface 112 and the second surface 114 may be selected to be 60 degree, a radius of curvature (Rx) in an x-axial direction may be 6.75 mm, and a radius of curvature (Ry) in a y-axis direction may be 9.05 mm.

FIG. 6 is a graph illustrating an optic power depending on an angle of the wedge-shaped prism for the light which is incident to the first surface 112 from an optical cable having a numerical aperture of 0.14, is reflected on the second surface 114 and the third surface 116 based on a refractive index of a substance, and is emitted back to the first surface 112.

Referring to FIG. 6, it is noted that the 57-degree wedge-shaped prism 110 has a high sensitivity in a section of 1.316 to 1.33 of the refractive index of a solution, which is the substance, and the 60-degree wedge-shaped prism 110 has a high sensitivity in a section of 1.347 to 1.37 of the refractive index of a solution, which is the substance. That is, it is confirmed that the angle between the first surface 112 and the second surface 114 in the wedge-shaped prism 110 can be adjusted to set the sensitivity of optic power for the refractive index in a certain section.

For example, the refractive index of deionized water (DI water), which is the purest water, is about 1.316 at the 1550 nm wavelength band. Therefore, the sensitivity for the refractive index of deionized water and a solution made with deionized water may be optimally determined when the optic power is measured by using the 57-degree wedge-shaped prism 110.

A first optical cable 130 connected to the light source 210 and a second optical cable 140 connected to the sensor part 220 may be coupled to the first surface 112 of the prism 110. The first optical cable 130 and the second optical cable 140 may be directly coupled to the prism 110 to prevent light from being lost or changed. Particularly, when the substance is a liquid such as a solution, the prism 110, the first optical cable 130, and the second optical cable 140 may be composed as one unit 100 to be immersed therein. Therefore, the prism 110 of the optical refractometer may be directly immersed into or contacted with a substance S such as a solution to facilitate analysis of the substance without sampling.

A single-mode optical cable may be used as the first optical cable 130 connected to the light source 210 to incident light into the prism 110, while a multi-mode optical cable may be used as the second optical cable 140 connected to the sensor part 220 to receive light from the prism 110. The optical cable connected to the light source 210 may be better to have a smaller core and the optical cable connected with the sensor part 220 may be better to have a larger core in order to prevent light from leaking as much as possible. For example, a core of a single-mode optical cable may be 9 um in size and a core of a multi-mode optical cable may be 50, 57, 62.5, or 105 um in size.

A block member may be further included in order to precisely and firmly align the first optical cable 130 and the second optical cable 140 with the prism 110. The block member may be disposed on the first surface 112 of the prism 110 to be coupled with the prism 110 and may have a V-shaped groove facing the first surface 112. The first optical cable 130 and the second optical cable 140 may be inserted and aligned in the V-shaped groove.

The numerical aperture of the first optical cable 130 may be adjusted to set a sensitivity and a linearity of the optical power for a predetermined refractive index.

FIG. 7 is a graph illustrating an optic power for a liquid refractive index depending on a numerical aperture of a first optical cable connected to a wedge-shaped prism.

Particularly, FIG. 7 is a graph illustrating an optic power depending on numerical aperture of the first optical cable 130 in a 57-degree wedge-shaped prism 110 for the light which is incident to the first surface 112, is reflected on the second surface 114 and the third surface 116 based on a refractive index of a substance, and is emitted back to the first surface 112.

Referring to FIG. 7, it can be seen that when the numerical aperture of the first optical cable 130 is changed, the sensitivity increases or decreases in a specific section of the optic power in the wedge-shaped prism 110. In addition, it can be seen that when the numerical aperture of the first optical cable 130 is changed, the linearity between the refractive index of the solution to be measured and the optical power is increased or decreased. Since the linearity between the refractive index of the solution and the optic power and the high sensitivity in a specific section exhibit a trade-off relationship with each other, it is preferable to set them according to a substance to be measure and purpose.

The signal analysis part 300 may be connected to the sensor part 220 to receive and analyze an electrical signal sent by the sensor part 220. Since the photodetector or CCD of the sensor part 220 converts the change of the received light into an electrical signal, the signal analysis part 300 electrically connected to the sensor part 220 may analyze changes in light through the electrical signal sent by the sensor part 220. Particularly, it is possible to analyze the composition or concentration of the substance by analyzing the change in refractive index.

The display part 400 may be connected to the signal analysis part 300 to display the analyzed result. The display part 400 may visually display the result analyzed by the signal analysis part 300, so that a user may check the composition or concentration of the substance in real time.

Figure 4:
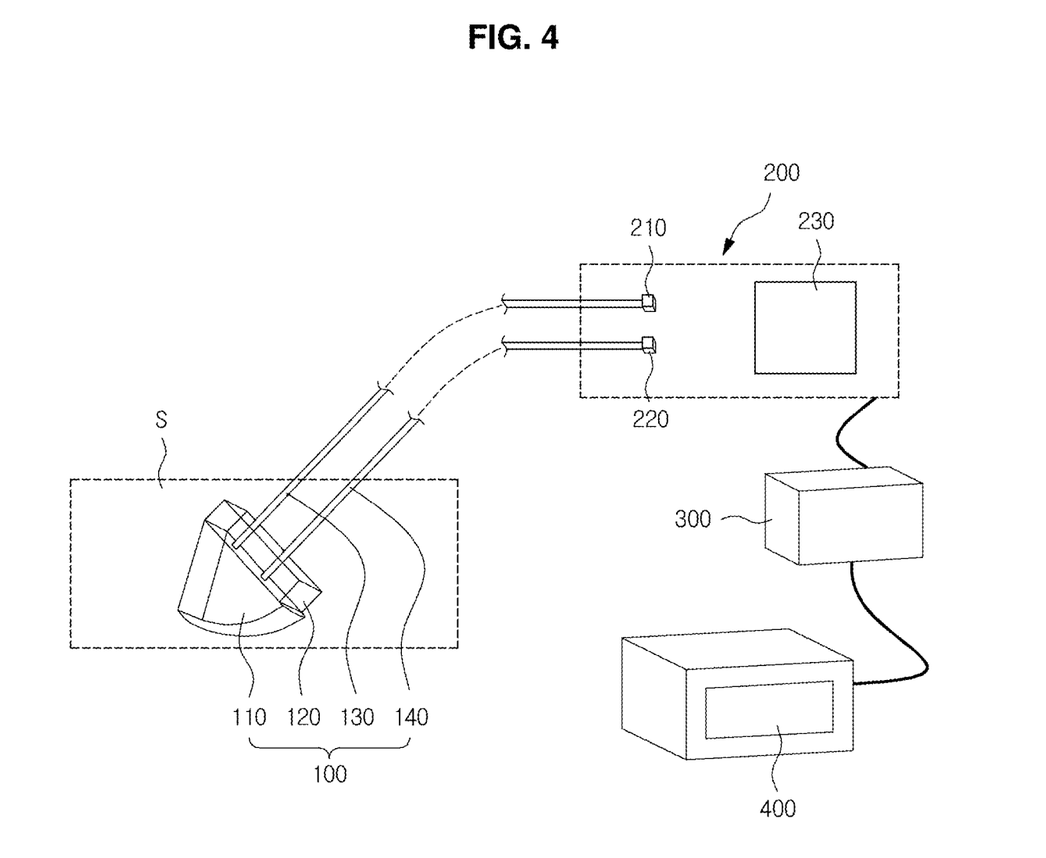
FIG. 4 and FIG. 5 are diagrams illustrating a real time monitoring analysis device with an optical refractometer according to another embodiment of the present invention.
Figure 5:
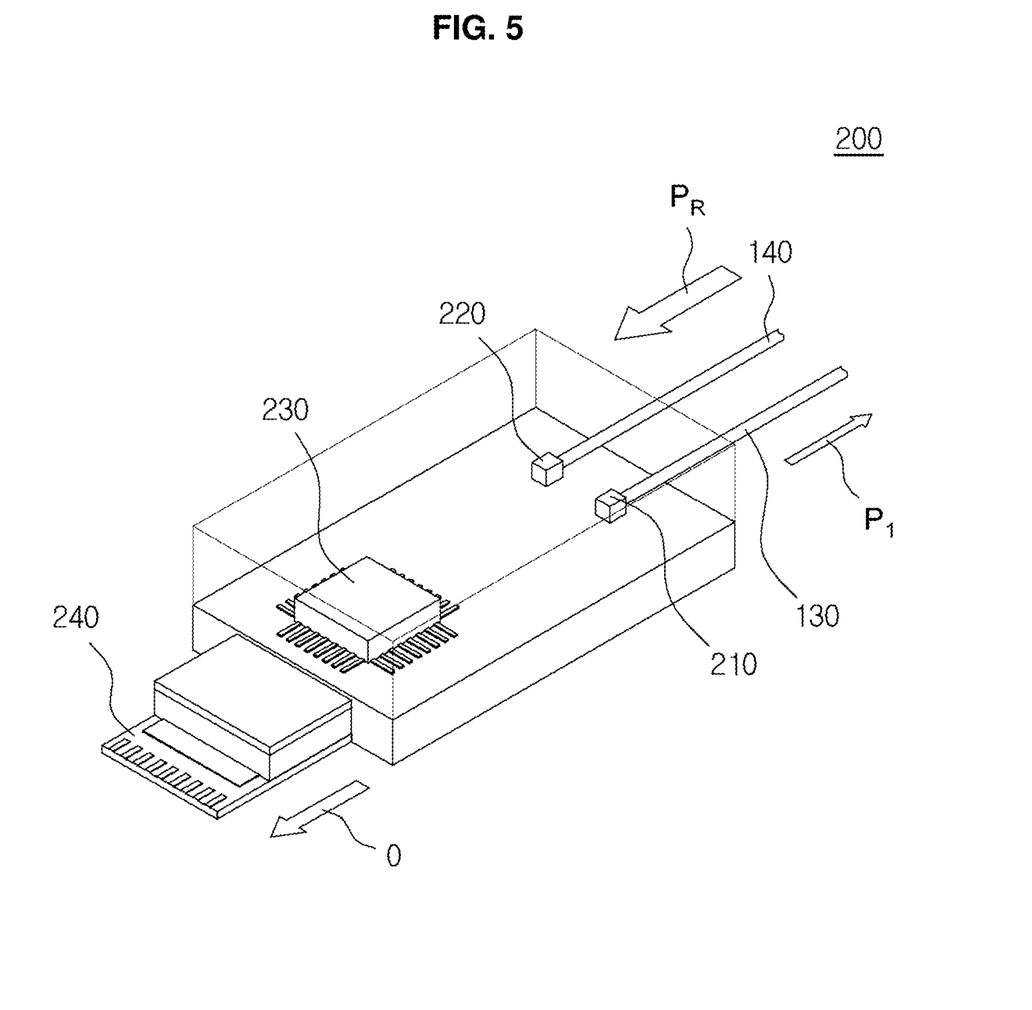

FIG. 4 and FIG. 5 are diagrams illustrating a real time monitoring analysis device with an optical refractometer according to another embodiment of the present invention.

Referring to FIG. 4 and FIG. 5, the analysis device of the present embodiment may further include a control part 230 connected to and controlling the light source 210 and the sensor part 220. Particularly, the light source 210, the sensor part 220, and the control part 230 may be composed as one transmission/reception unit 200. Accordingly, the light source 210 and the sensor part 220 may be controlled by wire/wireless through the control part 230. The control part 230 may include a communication module that exchanges signals with the outside. The control part 230 may also process the output of the sensor part 220 and send an output signal O to an external terminal 240.

The spirit of the present disclosure has been described by way of example hereinabove, and the present disclosure may be variously modified, altered, and substituted by those skilled in the art to which the present disclosure pertains without departing from essential features of the present disclosure. Accordingly, the exemplary embodiments disclosed in the present disclosure and the accompanying drawings do not limit but describe the spirit of the present disclosure, and the scope of the present disclosure is not limited by the exemplary embodiments and accompanying drawings. The scope of the present disclosure should be interpreted by the following claims and it should be interpreted that all spirits equivalent to the following claims fall within the scope of the present disclosure.

DESCRIPTION OF REFERENCE NUMERALS

110: Prism
112: First surface
114: Second surface
116: Third surface
117: Light reflection layer
130: First optical cable
140: Second optical cable
210: Light source
220: Sensor part
230: Control part
300: Signal analysis part
400: Display part

What is claimed is:

1. An optical refractometer comprising:
a prism including a first surface to which light is incident, a second surface to which the incident light is refracted when it contacts a substance, and a third surface configured to reflect the light refracted at the second surface toward the first surface;
a light source configured to emit light onto the first surface of the prism to be refracted toward the second surface; and
a sensor configured to receive the light reflected from the third surface and output from the first surface,
wherein the light projected from the light source is configured to travel an optical path that directs the light to pass through the first surface of the prism, refract on the second surface, reflect on the third surface, and emit and condense to the first surface, and
wherein the prism has a wedge shape such that an acute angle is formed between the first surface and the second surface at one side and the third surface in a curved or aspherical shape connecting the first surface and the second surface on the other side.

2. The optical refractometer of claim 1, further comprising a light reflection layer formed on the third surface of the prism and configured to block the contact between the substance and the third surface.

3. The optical refractometer of claim 2, further comprising:
a first optical cable connecting the light source and the first surface of the prism; and
a second optical cable connecting the sensor and the first surface of the prism.

4. The optical refractometer of claim 3, wherein the substance is liquid and wherein the prism, the first optical cable and the second optical cable are integrated into one unit to be immersed in the substance in a liquid state.

5. The optical refractometer of claim 3, further comprising a plurality of cables, each having a different numerical aperture, wherein one of the plurality of cables is selected and used as the first optical cable such that a linearity and a sensitivity of optic power are set for a predetermined refractive index.

6. The optical refractometer of claim 1, wherein the prism comprises a plurality of prisms, each having a different angle formed between the first surface and the second surface, and wherein one of the plurality of prisms is selected and used such that a sensitivity of optic power is set for a predetermined refractive index.

7. A real time monitoring analysis device comprising:
an optical refractometer including:
- a prism including a first surface to which light is incident, a second surface to which the incident light is refracted when it contacts a substance, and a third surface configured to reflect the light refracted at the second surface toward the first surface;
- a light source configured to emit light onto the first surface of the prism to be refracted toward the second surface; and
- a sensor configured to receive the light reflected from the third surface and output from the first surface, wherein the light projected from the light source is configured to travel an optical path that directs the light to pass through the first surface of the prism, refract on the second surface, reflect on the third surface, and emit and condense to the first surface;

a signal processor connected to the sensor of the optical refractometer and configured to analyze an output of the sensor; and a display connected to the signal processor to display an analyzed result, wherein the prism has a wedge shape such that an acute angle is formed between the first surface and the second surface at one side and the third surface in a curved or aspherical shape connecting the first surface and the second surface on the other side.

8. The real time monitoring analysis device of claim 7, further comprising:
- a first optical cable connecting the light source and the first surface of the prism; and
- a second optical cable connecting the sensor and the third surface of the prism.

9. The real time monitoring analysis device of claim 8, further comprising a plurality of cables, each having a different numerical aperture, and wherein one of the plurality of cables is selected and used as the first optical cable such that a linearity and a sensitivity of optic power are set for a predetermined refractive index.

10. The real time monitoring analysis device of claim 7, wherein the sensor comprises a photodetector or a charge coupled device (CCD).

11. The real time monitoring analysis device of claim 7, further comprising a controller connected to the light source and the sensor to control them, wherein the light source, the sensor and the controller are integrated into one transmission/reception unit.

12. The real time monitoring analysis device of claim 7, wherein the prism comprises a plurality of prisms, each having a different angle formed between the first surface and the second surface, and wherein one of the plurality of prisms is selected and used such that a sensitivity of optic power is set for a predetermined refractive index.

* * * * *